May 7, 1963 W. T. CORSETTE 3,088,759
SWIVEL PIPE COUPLING HAVING LOW FRICTION SEALS
Filed June 29, 1959
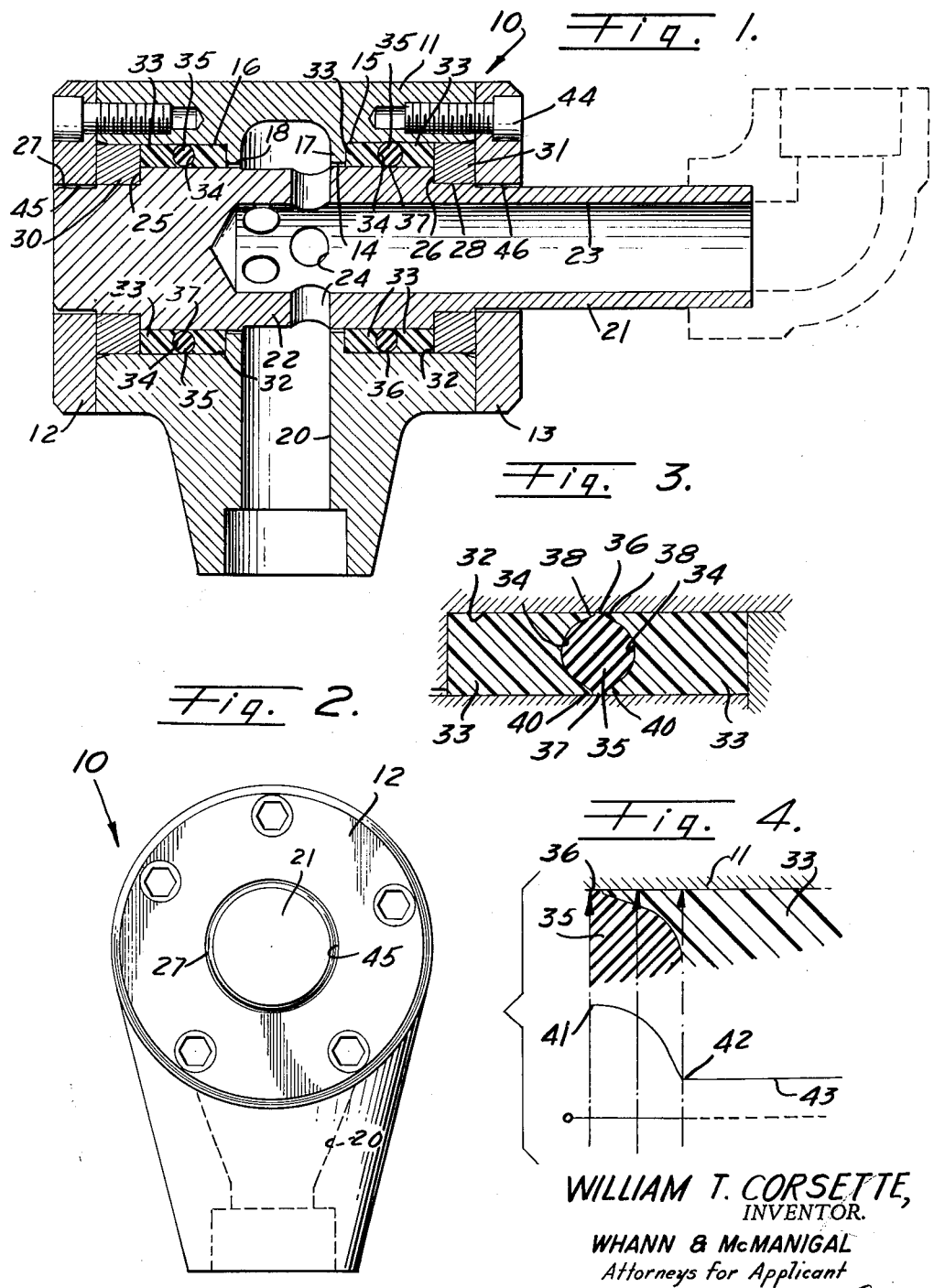
WILLIAM T. CORSETTE,
INVENTOR.
WHANN & McMANIGAL
Attorneys for Applicant

United States Patent Office 3,088,759
Patented May 7, 1963

3,088,759
SWIVEL PIPE COUPLING HAVING LOW FRICTION SEALS
William T. Corsette, Long Beach, Calif.; Nancy N. Corsette, executrix of said William T. Corsette, deceased, assignor to Dwight J. Ainsworth, Long Beach, Calif.
Filed June 29, 1959, Ser. No. 823,475
1 Claim. (Cl. 285—190)

This invention relates, in general, to pipe joints or couplings and, more particularly, to rotary or swivel type pipe couplings or joints which interconnect to pipe elements for rotary movement with respect to each other and yet maintain a fluid-tight joint therebetween.

It is a general object of my invention to provide a new and improved swivel joint which operates with a maximum of efficiency yet offers a minimum of frictional resistance to relative movement between the parts.

Another object of my invention is to provide a new and improved swivel joint which is hydraulically balanced and which utilizes very low friction seals to allow the assembly to flex easily at maximum operating pressures to allow for misalignment of piping to which the assembly is connected.

Still another object of my invention is to provide a new and improved swivel joint which requires no service or attention, requires no greasing or the like, and requires no adjusting.

Still another and more specific object of my invention is to provide a new and improved swivel joint containing special low friction permanently lubricated bearings which are simple in construction and which can be used to provide long-period, trouble-free service.

Other and additional objects of my invention will be apparent to those skilled in the art from the following description when taken in connection with the accompanying drawings in which:

FIG. 1 is a cross-sectional elevational view of a swivel joint constructed in accordance with the teachings of my invention;

FIG. 2 is an end view of the swivel joint depicted in FIG. 1;

FIG. 3 is an enlarged fragmentary detail view illustrating to advantage a portion of the sealing means for my swivel joint; and FIG. 4 is a semischematic diagram illustrating the pressure pattern of the sealing means illustrated in connection with my invention.

Turning now to the drawings and in particular to FIGS. 1 and 2 thereof, it can be seen that I have illustrated my swivel joint in its entirety as 10, having a body member 11 and a pair of circular end plates 12 and 13. The body member 11 is centrally cylindrically bored, as at 14, and counterbored, as at 15 and 16, from each end to define centrally thereof a pair of radially inwardly extending shoulders 17 and 18. Body 11 is further bored to define a communication passage 20 which, in the embodiment illustrated, is transverse to the central bore 14.

Body 11 is provided with a rotatable pipe member 21, the largest diameter of which is slightly less than the diameter of the bore 14, and indicated at 22, and which is disposed centrally of the body 11. Pipe member 11 is provided with a central coaxial bore 23 and a plurality of apertures 24 so that the passage 23 is in open communication with the passage 20 of the body member. Pipe member 21, extending outwardly beyond the end plates, may be suitably connected to any suitable pipe coupling means.

The outer periphery of the pipe member 21 is provided with a pair of radially extending shoulders 25 and 26 by reason of the outer diameter of the pipe member being reduced at 27 and 28 to define the aforementioned large diameter 22. The shoulders 25 and 26 are located a distance within the counterbore 15 and 16 and are spaced from the end plates 12 and 13, respectively, so as to accommodate cylindrically shaped bearing means 30 and 31 of any suitable material but preferably of self-lubricating sintered bronze. The bearing means 30 and 31 cooperate with the counterbores 15 and 16 and with the end plates 12 and 30 to seal my swivel joint, yet permit limited flexibility for accommodating misaligned pipes, as will now be described.

Attention is now directed in particular to FIGS. 3 and 4, where one of the sealing means is shown and enlarged for clarity. It can be seen that the counterbore 15, pipe member 21, and end plate 13 define a sealing chamber 32 which is provided with a pair of symmetrical packing members 33, 33, each of which have a forward surface groove substantially concave in cross section, as shown in FIG. 3, and identified at 34, 34. These concave forward surfaces are spaced apart and receive therebetween a deformable sealing means of any suitable material, such as rubber or rubber-like O-ring seal 35, and which, under action of the packing members 33, 33, is compressed. Thus, as clearly seen in FIG. 3, the packing member 33, 33 with the O-ring seal 35 therebetween are slightly longer than the distance from the shoulder 17 and the shoulder 26 so that, when urged toward one another by a means yet to be described, the O-ring seal 35 is in tight sealing engagement with the inner surface of the counterbore 15, as at 36, and with the outer surface of the pipe member 21, as at 37. In addition to the tight sealing engagement of the O-ring seal 35, the packing members, being of any suitable deformable material, will react to be urged by the O-ring seal so that outer lips 38, 38 and inner lips 40, 40 will engage the inner surface of the counterbore 15 and outer surface of the pipe member.

In the one embodiment shown in FIG. 4, where the sealing ring 35 is rubber and the packing members 33 are of Teflon, taking a representative pressure at which the O-ring seal 35 engages the surfaces of the chamber, it can be seen that the sealing pressure is maximum at points 36, 37 where the O-ring seal engages the surfaces of the sealing chamber, as indicated at 41, and decreases gradually to a point 42 which is in line with the innermost part of the concave surfaces 34, 34, and serves to remain at a high pressure by reason of the deformability of the plastic packing members, as illustrated at 43.

The compression of the O-ring seal 35 and the packing members 33, 33 is accomplished in the embodiment disclosed by the bearing means 31 which is urged into tight pressure engagement with the end of the packing member 33 by the end plate 13 which, in turn, is held in tight engagement with the end of the body member 11 by bolt means 44. Thus, since the distance between the shoulder 17 and the inner surface of the end plate 13 is less than the distance between the left end of the packing member 33 and the right end of the bearing means 31 when the end plates are brought into tight sealing engagement with the bearing means 31 by bolts 44, a tight seal is accomplished. This tight seal is also a hermetic seal so that my swivel joint may be immersed in another liquid, if desired. While I have described the embodiment of FIG. 4 utilizing rubber or rubber-like material for the seal 35 and Teflon for the packing member 33 to obtain the pressure curve shown in FIG. 4, the seal 35 could also be of any suitable deformable material and the packing member could be of a material, such as steel, since the outer lips 38, being thin, would still deform and be urged against the surfaces of the sealing chamber. Likewise, the packing member could be of dissimilar yieldable materials by laminating or embedding or plating the packing member in various ways. In such cases, however, the pressure curve, such as shown in FIG. 4, would vary and could be controlled within practical limits and may be a straight line, if desired, between the points 41 and 42, depending upon the materials used.

While I have described only one sealing chamber and one sealing means, the sealing chamber and sealing means on the other end of the body member is structurally and functionally the same and need not be described. It is to be noted, too, that the bores 45 and 46 are slightly larger than the outer periphery of the pipe member 21 where the latter extends therethrough so that a limited flexibility to accommodate a misalignment of the pipe members to which the swivel joint may be connected is accommodated.

Thus, it can be seen that from the above description, I have invented a swivel joint which has relatively simple parts which requires no service or attention, requires no greasing or the like and requires no adjusting. The low friction, permanently lubricating bearing means 31 permit long, trouble-free life and the assembly of the entire joint by means of the bolt means 44 through the end plates permits assembly an disassembly under service conditions.

In addition, it can be seen that my seals for my swivel joint, each of which comprise soft material, such as rubber, and relatively hard material, such as Teflon, arranged to have the softer material deform the harder material by force applied to the seals by my bearing means and end plates, contribute to the success of my invention. I have also found that with the soft material under compression by the relatively hard material that the softer material can withstand higher shock loads than heretofore possible, which permit my joint to be used in high pressure systems.

While the various parts herein have been described as upper or lower or in a right or left position, such description refers only to the relative position of the parts, as shown in the drawings, and is not intended to be a limitation of the invention; it being understood that the appended claims should be construed as broadly as the prior art would permit.

I claim:

In a swivel joint, means defining a body having a central bore and a second bore for fluid communication with said central bore, means defining a pipe member rotatably mounted in said body member in spaced relationship and having ports therein in communication with said central bore for communication of fluid between said pipe member and said second bore, and pipe shoulders on opposite sides of said ports, and recess means in said central bore on opposite sides of said ports defining seal chambers disposed about said pipe member, sealing means in said seal chambers, said sealing means comprising a pair of packing means formed from deformable plastic material, means defining forward surfaces concave in cross section on each of said packing means facing one another but spaced therefrom, a deformable sealing ring of circular cross section disposed between said forward surfaces, and means urging said packing means toward one another precompressing and deforming said deformable sealing ring and the lips of said forward surfaces so that the inner and outer periphery of said packing means and said deformable sealing ring engages surfaces of the seal and pipe chambers forming a fluid-tight joint, said means urging said packing means including annular members engaging said body and said pipe shoulders and forming the end wall of each of said sealing chambers and providing combined thrust and axial bearing means for said pipe member and an end plate on said body member.

References Cited in the file of this patent

UNITED STATES PATENTS

| | | |
|---|---|---|
| 1,949,961 | Hansen | Mar. 6, 1934 |
| 2,480,858 | Hobbs | Sept. 6, 1949 |
| 2,494,598 | Waring | Jan. 17, 1950 |
| 2,728,620 | Krueger | Dec. 27, 1955 |
| 2,927,804 | Snyder | Mar. 8, 1960 |
| 2,963,304 | Comlossy et al. | Dec. 6, 1960 |

FOREIGN PATENTS

| | | |
|---|---|---|
| 209,547 | Australia | July 29, 1957 |